US009738457B2

United States Patent
Zhang et al.

(10) Patent No.: US 9,738,457 B2
(45) Date of Patent: Aug. 22, 2017

(54) WORKPIECE TURNOVER MECHANISM

(71) Applicants: HONGFUJIN PRECISION ELECTRONICS (CHENGDU) Co., Ltd., Chengdu (CN); HON HAI PRECISION INDUSTRY CO., LTD., New Taipei (TW)

(72) Inventors: Yi-Jian Zhang, Shenzhen (CN); Jun-Ping Zhao, Shenzhen (CN)

(73) Assignees: HONGFUJIN PRECISION ELECTRONICS (CHENGDU) Co., Ltd., Chengdu (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/075,380

(22) Filed: Mar. 21, 2016

(65) Prior Publication Data

US 2016/0347554 A1    Dec. 1, 2016

(30) Foreign Application Priority Data

May 26, 2015    (CN) .................... 2015 2 0345517 U

(51) Int. Cl.
*B65G 47/248*    (2006.01)
*B23P 19/04*    (2006.01)
*B23P 19/00*    (2006.01)

(52) U.S. Cl.
CPC ............ *B65G 47/248* (2013.01); *B23P 19/04* (2013.01); *B23P 19/002* (2013.01)

(58) Field of Classification Search
CPC ..... B65G 47/24; B65G 47/248; B23P 19/002; H01L 21/673; H01L 21/67313
See application file for complete search history.

(56) References Cited

U.S. PATENT DOCUMENTS

| | | | |
|---|---|---|---|
| 5,639,203 A * | 6/1997 | Lee .................... | H05K 13/0482 414/416.02 |
| 8,240,726 B2 * | 8/2012 | Subotincic .......... | B25J 15/0052 198/468.3 |

* cited by examiner

*Primary Examiner* — Mark Beauchaine
(74) *Attorney, Agent, or Firm* — Steven Reiss

(57) ABSTRACT

A turnover mechanism configured to turn over workpieces includes a bracket, a drive device, and a turnover module mounted on the bracket. The turnover module includes a rotating shaft, a plurality of suction assemblies, a plurality of horizontal drive assemblies, and a plurality of connecting rods. The guide rails are mounted on the rotating shaft. The suction assemblies are slidably coupled to each guide rail. The horizontal drive assemblies are mounted on the corresponding guide rails. Each connecting rod is connected between each two of the plurality of suction assemblies adjacent to each other. The connecting rod is configured to adjust distance between the two suction assemblies. Each horizontal drive assembly is connected to the suction assembly mounted at one end of the corresponding guide rail, and the horizontal drive assembly is configured to drive the suction assemblies coupled to the corresponding guide rail to move.

12 Claims, 5 Drawing Sheets

WORKPIECE TURNOVER MECHANISM

FIELD

The subject matter herein generally relates to a workpiece turnover mechanism.

BACKGROUND

In industrial production or assembly processes, there is a need to turn over the workpiece in order to process the opposite sides of the workpiece. A conventional turnover mechanism includes a bracket and a turnover module rotatably mounted on the bracket. The turnover module can hold the workpiece tightly by sucking one surface of the workpiece. When the turnover module is rotated 180 degrees, the workpiece is rotated 180 degrees with the turnover module.

BRIEF DESCRIPTION OF THE DRAWINGS

Implementations of the present technology will now be described, by way of example only, with reference to the attached figures.

DETAILED DESCRIPTION

Figure 1:
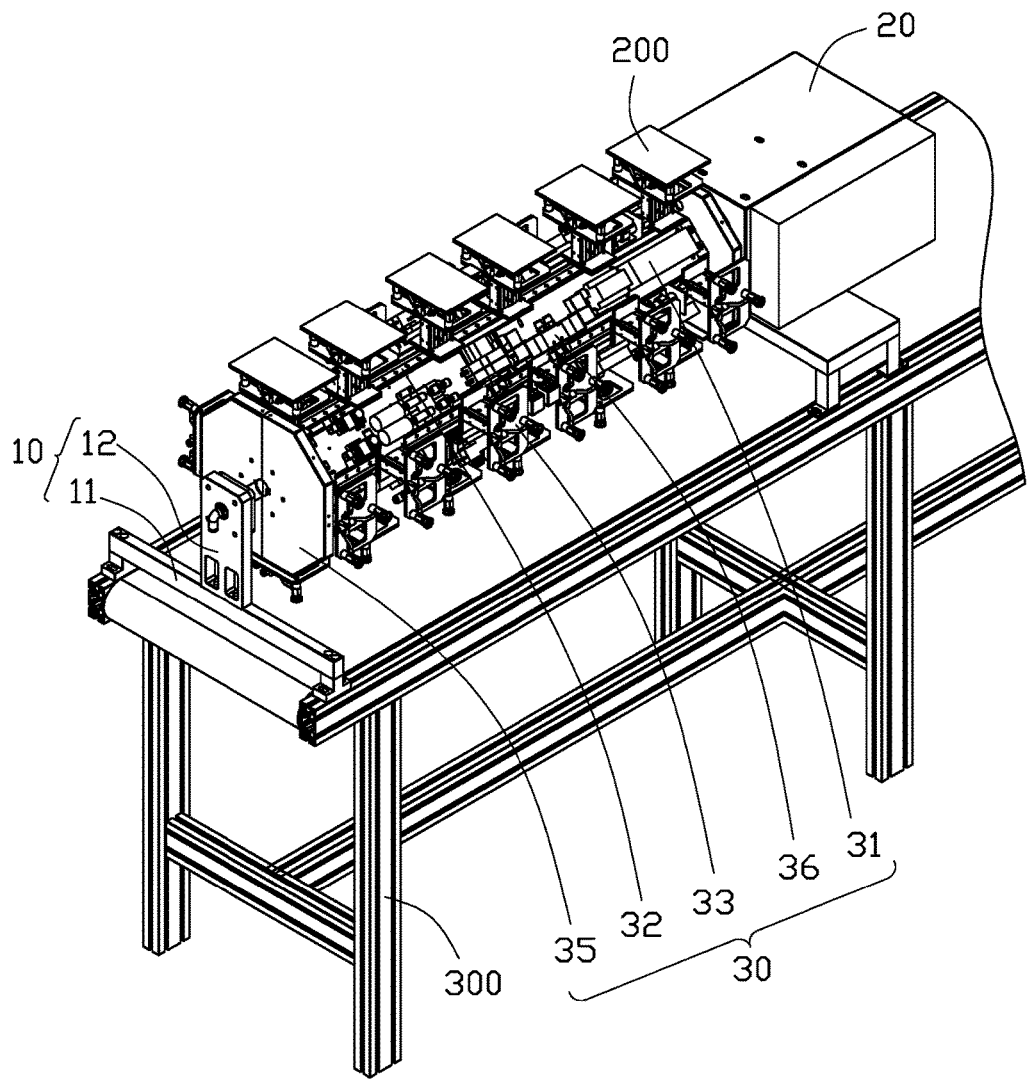
FIG. 1 is an isometric view of one embodiment of a turnover mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a workpiece turnover mechanism configured to turnover workpieces.

FIG. 1 illustrates that a workpiece turnover mechanism 100 can include a bracket 10, a drive device 20, and a turnover module 30 mounted on the bracket 10. The drive device 20 can be mounted at one side of the turnover module 30.

The bracket 10 can include a bottom plate 11 and a side plate 12. The side plate 12 can be vertically connected to the bottom plate 11. The bottom plate 11 can be mounted above a transmission mechanism 300. The transmission mechanism 300 can be configured to transmit workpieces 200. In at least one embodiment, the transmission mechanism 300 can be a transmission belt. The drive device 20 and the side plate 12 can be mounted at two opposite sides of the bottom plate 11. The drive device 20 can be an actuating motor.

The turnover module 30 can include a rotating shaft 31, a plurality of guide rails 32 mounted on the rotating shaft 31, a plurality of suction assemblies 33 mounted on each of the guide rails 32, two stopper plates 35 mounted at two opposite ends of the rotating shaft 31, and a plurality of vacuum generators 36. The rotating shaft 31 can be substantially cylinder-shaped, and one end of the rotating shaft 31 can be rotatably connected to the side plate 12. The other end of the rotating shaft 31 can be coupled to the drive device 20, thereby the rotating shaft 31 can rotate when driven by the drive device 20. The guide rails 32 can extend along the length of the rotating shaft 31. In at least one embodiment, there are four guide rails 32, and the four guide rails 32 can be evenly spaced from each other. The two stopper plates 35 can be configured to protect the suction assemblies 33.

Figure 2:
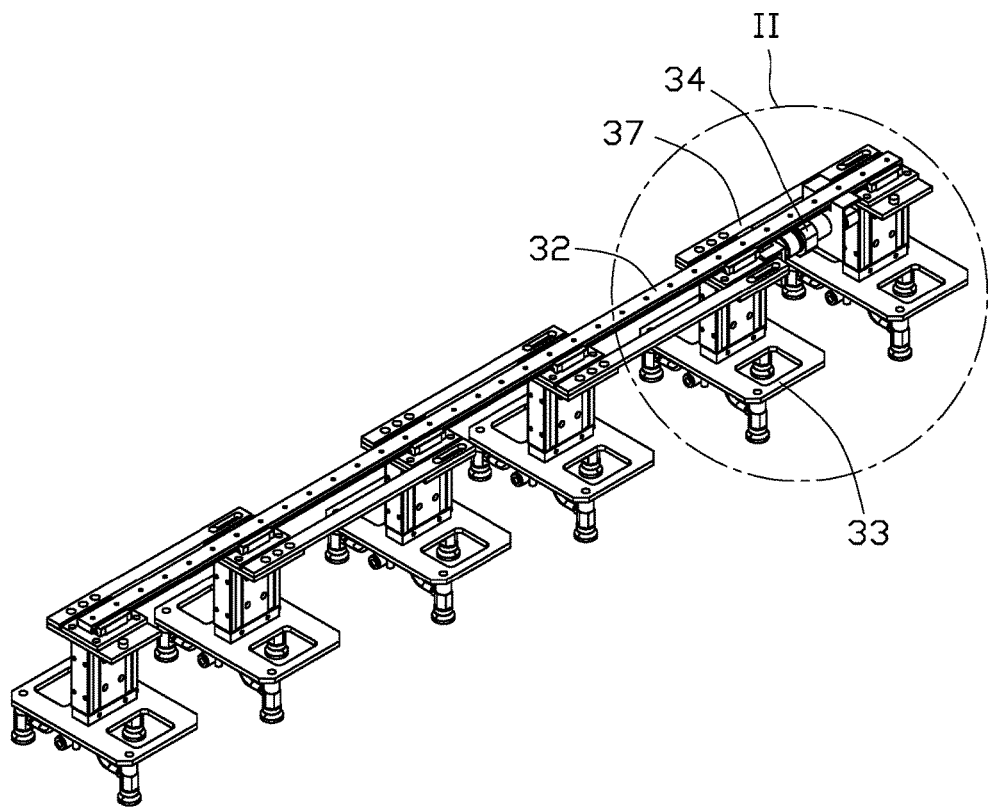
FIG. 2 is an isometric view of a guide rail and a plurality of suction assemblies of the turnover mechanism shown in FIG. 1.

The turnover module 30 can further include a plurality of horizontal drive assemblies 34 and a plurality of connecting rods 37. Each horizontal drive assembly 34 can be coupled to one of the guide rails 32. FIG. 2 illustrates the connecting rods 37 can be coupled to two sides of the guide rail 32, and each connecting rods 37 can be positioned between two adjacent suction assemblies 33. In at least one embodiment, there are six suction assemblies 33 mounted on each guide rail 32, and there are five connecting rods 37 coupled to each guide rail 32.

Figure 3:
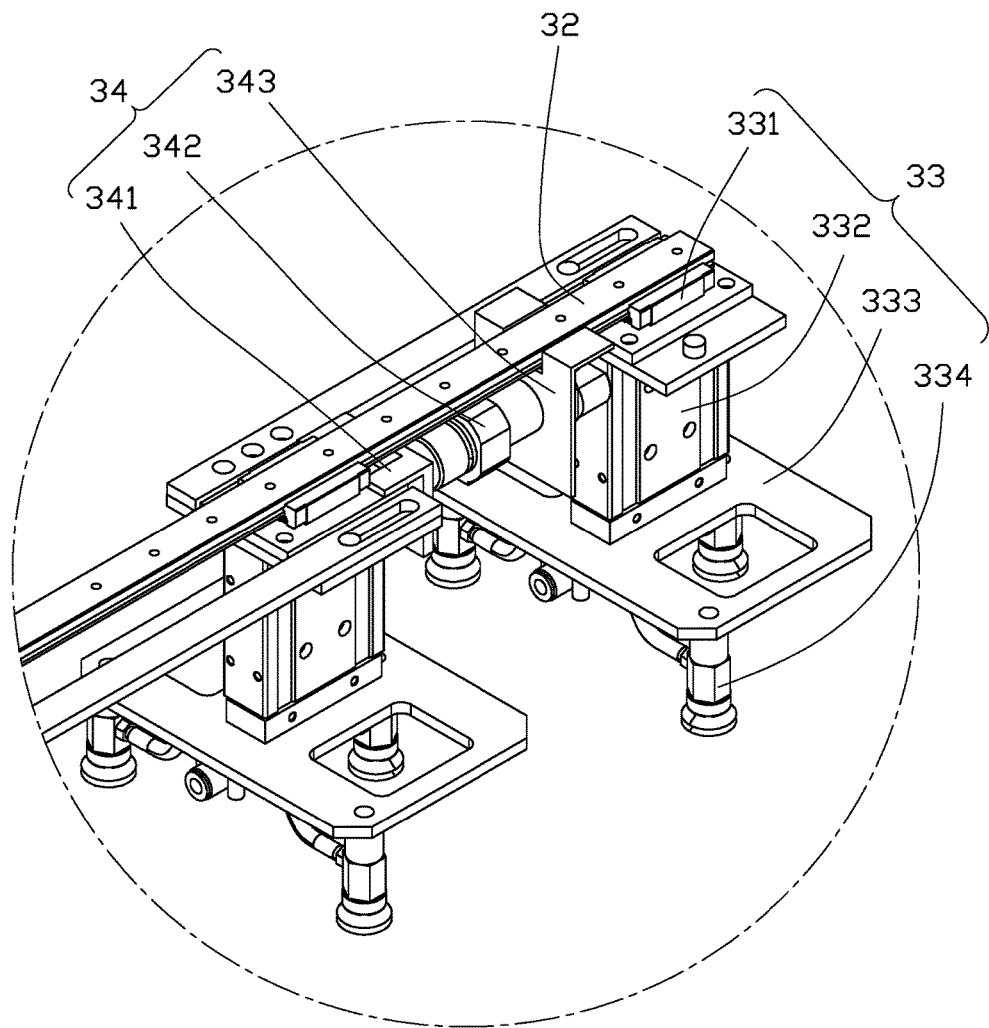
FIG. 3 is a partial, enlarged view of a portion II of the guide rail and the suction assemblies shown in FIG. 2.

FIG. 3 illustrates that each suction assembly 33 can include a base 331 slidably coupled to the guide rail 32, a drive member 332 mounted on the base 331, a fixing plate 333 coupled to the drive member 332, and at least one suction cup 334 mounted to the fixing plate 333. The base 331 can be substantially rectangular. The drive member 332 can be a cylinder configured to drive the fixing plate 333 and the at least one suction cup 334.

Each horizontal drive assembly 34 can include a fixing block 341, a horizontal drive member 342, and a pushing block 343. The fixing block 341 can be vertically coupled to the guide rail 32, and the horizontal drive member 342 can be mounted at the a middle portion of the fixing block 341 and parallel to the guide rail 32. The pushing block 343 can be coupled to the base 331. The suction assembly 33 can move along the guide rail 32 when driven by the horizontal drive member 342 of the horizontal drive member 34. In at least one embodiment, the horizontal drive member 342 can be a pen cylinder. There are four horizontal drive assemblies 34, and each horizontal drive assembly 34 is coupled to one of the guide rail 32. The horizontal drive assembly 34 can be mounted adjacent to the stopper plate 35 and positioned between two adjacent suction assemblies 35 on one guide rail 32. The pushing block 343 can be coupled to the base 331 of the suction assembly 35 adjacent to the stopper plate 35.

Figure 4:
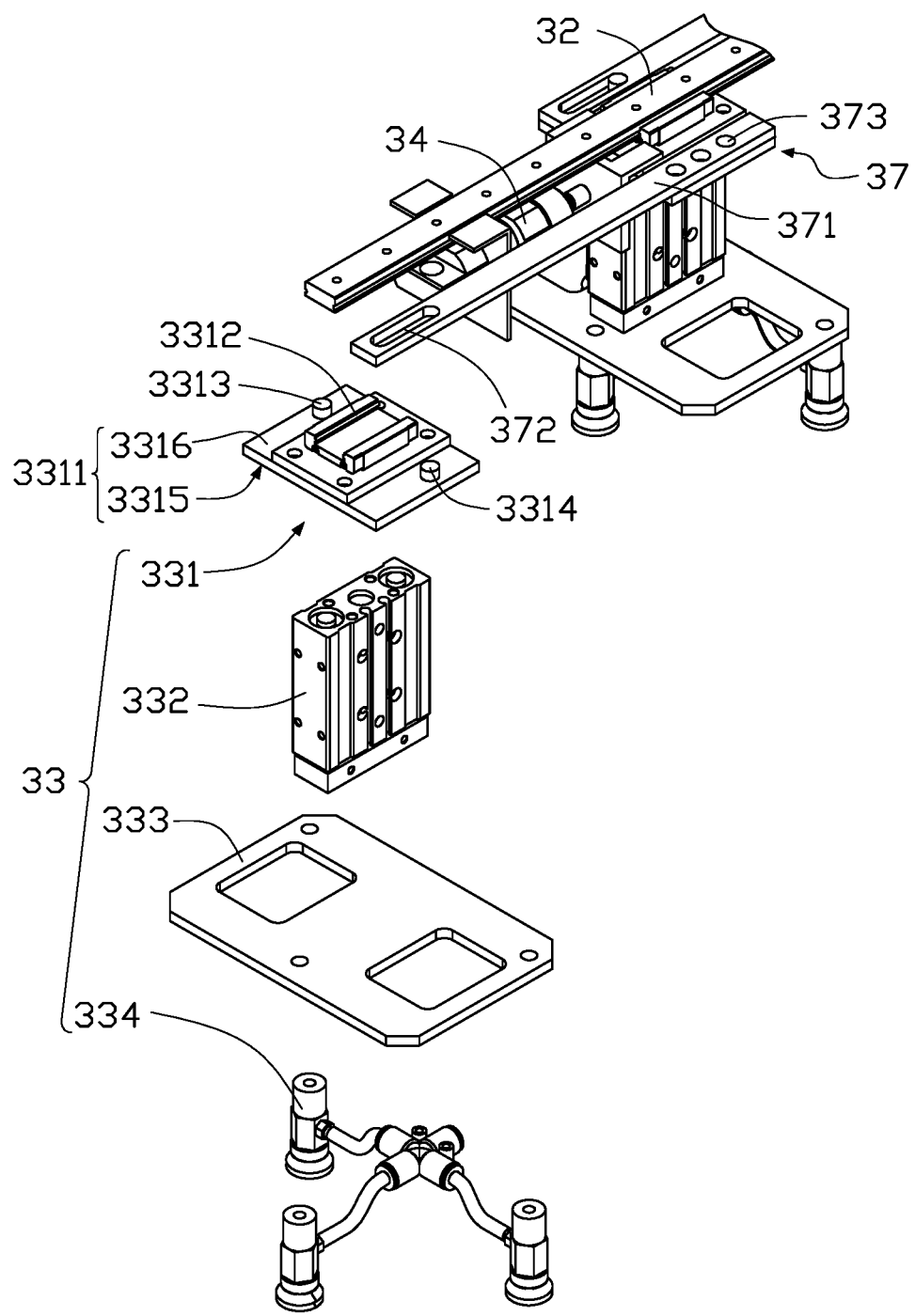
FIG. 4 is an exploded, isometric view of the portion II of the guide rail and the suction assemblies shown in FIG. 2.

FIG. 4 illustrates that the base 331 can include a main body 3311, a catch portion 3312 mounted on the main body 3311, at least one locating pin 3313 and at least one stop pin 3314. The main body 3311 can include a first surface 3315 and a second surface 3316 opposite to each other. The drive member 332 can be coupled to the first surface 3315, and the catch portion 3312 can be coupled to the second surface 3316. The catch portion 3312 can be positioned between the locating pin 3313 and the stop pin 3314. The catch portion 3312 can be slidably coupled to the guide rail 32, thereby the suction assembly 33 can move relative to the guide rail 32. The locating pin 3313 and the stop pin 3314 can be positioned at two opposite edges of the second surface 3316. Four suction cups 334 can be evenly spaced from each other and coupled to the vacuum generator 36. The suction cups 334 can suck the workpiece controlled by the vacuum generator 36.

The connecting rod 37 can be substantially plate shaped and include a connecting portion 371. One end of he connecting rod 37 can define a guide hole 372, and another end of the connecting rod 37 can define a plurality of locating holes 373. The guide hole 372 can be a linear hole through the connecting portion 371 and extend along the length of the connecting portion 371. The guide hole 371 can have a determined length. The stop pin 3314 can be received in the guide hole 372, so the guide hole 317 can limit the movement of the stop pin 3314. The locating holes 373 can be through holes and arranged evenly spaced from each other. The locating pin 3313 can be received in one of the locating holes 373. The locating pins 3313 can be received at different locating holes 373, thereby the space between two adjacent suction assemblies 33 can be adjusted.

Figure 5:
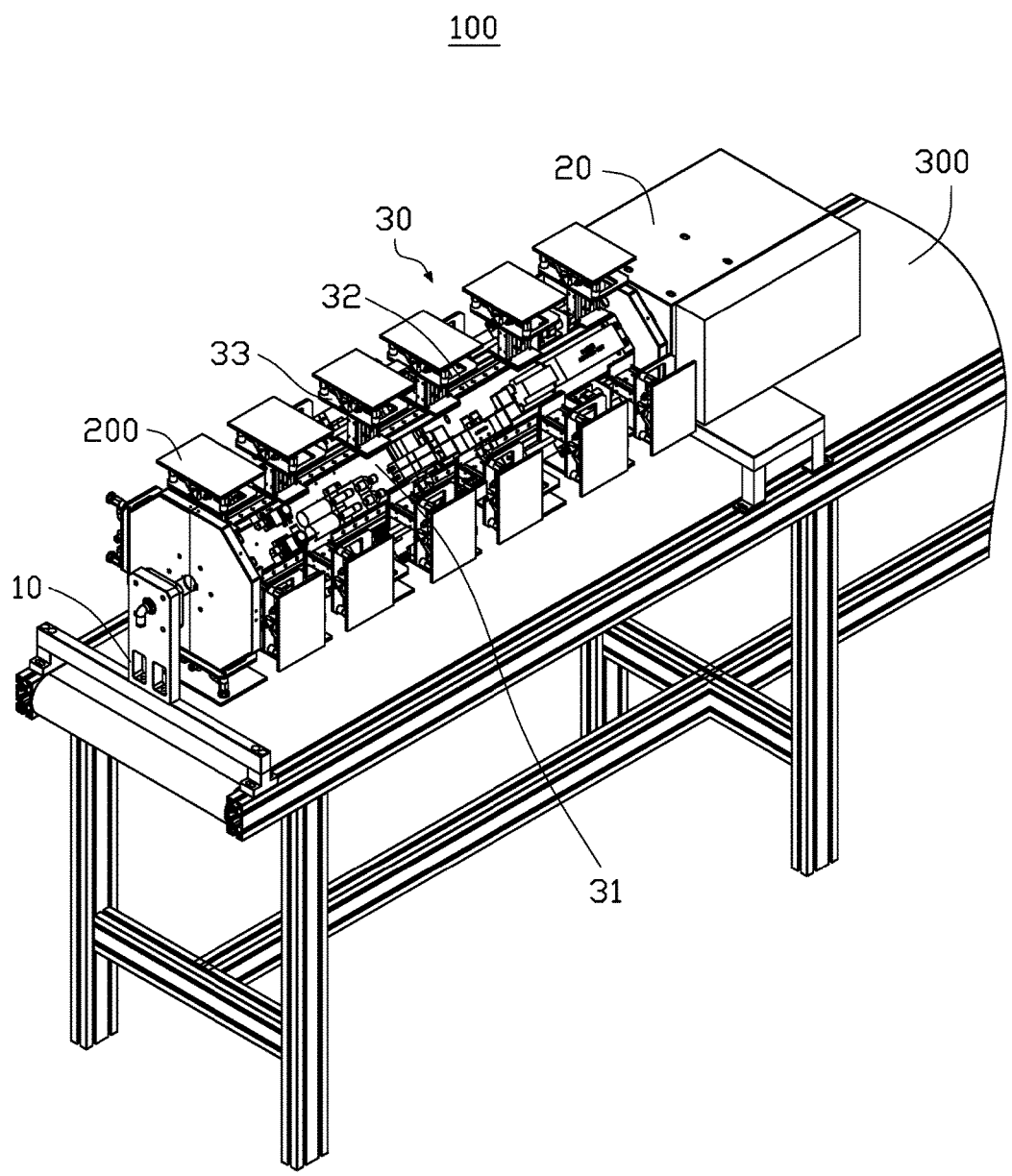
FIG. 5 is an isometric view of the turnover mechanism in using state.

FIG. 5 illustrates the turn over mechanism 100 in a using state. In use, a feeding mechanism (not shown) feeds the workpieces 200 to the workpiece turnover mechanism 100, and the workpieces 200 are suction onto the suction cups 334 coupled to one guide rail 32. The vacuum generators 36 generate a vacuum in the plurality of suction cups 334, therefore the suction cups 334 can contact and hold the workpiece 200. The rotating shaft 31 can rotate 90 degrees driven by the drive device 20, and the workpieces 200 hold on the suction cups 334 can rotate, while a plurality of suction cups 334 coupled to one other guide rail 32 can rotate to a position toward the feeding mechanism, and the workpieces 200 can suctioned onto the suction cups 334 toward the feeding mechanism. Repeat the above process, and the suction cups 334 coupled to one other guide rail can rotate to the position toward the feeding mechanism, and the workpieces 200 can suctioned onto the suction cups 334. After that, the rotating shaft 31 can rotate 90 degrees, and the suction cups 334 toward the transmission mechanism 300 can release the workpiece 200 to the transmission mechanism 300. Repeat the above process, the turnover mechanism 100 can continuously turn over the workpiece 200.

The distances/gaps between the suction assemblies 33 coupled to one guide rail 32 can be adjusted. The horizontal drive member 342 can push the suction assembly 33 adjacent to the stopper plate 35 to move along the guide rail 32. The stop pin 3314 of the base 331 can move along the guide hole 372, until the stop pin 3314 abuts one end of the guide hole 372. When the horizontal drive member 342 continue to push the suction assembly 33 adjacent to the stopper plate 35, the another suction assembly 33 coupled to one same connecting rods with the suction assembly 33 driven by the horizontal drive member 342 can be pulled by the connecting rod 37. As the another suction assembly 33 can move along the guide rail 32, the spaces between the two suction assemblies 33 connected to one connecting rod 37 can be increased. The spaces between the two suction assemblies 33 connected to one connecting rod 37 can also be decreased.

In at least one embodiment, the group of the suction assemblies 33 coupled to one guide rail 32 can be driven by one horizontal drive assembly 34. In other embodiments, each suction assembly 33 can be driven by one corresponding horizontal drive assembly 34.

The turnover mechanism 100 can include the rotating shaft 31 and a plurality of suction assemblies 33 coupled to the rotating shaft. Therefore, the workpieces 200 can be turn by the suction assemblies 33. As the turnover mechanism 100 can further include a plurality of guide rails 32 coupled to the rotating shaft 31, and the distance between each adjacent suction assemblies 33 can be adjusted, the turnover mechanism 100 can turn over workpieces of different sizes.

The embodiments shown and described above are only examples. Many details are often found in the art such as the other features of a turnover mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A turnover mechanism configured to turn over workpieces, the turnover mechanism comprising:
    a bracket;
    a drive device mounted on the bracket; and
    a turnover module mounted on the bracket, the turnover module comprising:
        a rotating shaft rotatably mounted on the bracket, the rotating shaft coupled to the drive device and configured to be rotated by the drive device;
        a plurality of guide rails mounted on the rotating shaft, two of the plurality of guide rails being positioned at two opposite sides of the rotating shaft and extending along the length of the rotating shaft;
        a plurality of suction assemblies slidably coupled to each of the plurality of guide rails and configured to take and put the workpiece;
        a plurality of horizontal drive assemblies, each of the horizontal drive assemblies being mounted on a corresponding one of the plurality of guide rails; and
        a plurality of connecting rods, each of the connecting rods being connected between two of the plurality of suction assemblies that adjacent to each other, wherein the connecting rod is configured to adjust a distance between the two suction assemblies coupled to the connecting rod; and
    wherein each of the horizontal drive assemblies is connected to the suction assembly mounted at one end of the corresponding guide rail, and the horizontal drive assembly is configured to drive the plurality of suction assemblies coupled to the corresponding guide rail to move.

2. The turnover mechanism as claimed in claim 1, wherein each of the suction assemblies comprises a base slidably coupled to the corresponding guide rail, a drive member mounted on the base, a fixing plate coupled to the drive member, and at least one suction cup mounted on the fixing plate, and the drive member is configured to drive the fixing plate and the suction cup to move.

3. The turnover mechanism as claimed in claim 2, wherein the base comprises a main body, a catch portion, at least one locating pin, and at least one stop pin, and the catch portion is slidably coupled to the corresponding guide rail.

4. The turnover mechanism as claimed in claim 3, wherein the main body comprises a first surface and a second surface opposite to each other, the drive member is mounted on the first surface, the catch portion is positioned on the second surface, the locating pin and the stop pin are positioned at two opposite edges of the second surface.

5. The turnover mechanism as claimed in claim 3, wherein each of the connecting rods comprises a connecting portion and defines a guide hole and a plurality of locating holes, the guide hole is defined at one end of the connecting portion, and the plurality of locating holes are defined at an other end of the connecting portion.

6. The turnover mechanism as claimed in claim 5, wherein the guide hole is a linear through hole extending the length of the connecting portion, the stop pin is received in the guide hole, and the locating pin is received in one of the locating holes.

7. The turnover mechanism as claimed in claim 5, wherein the plurality of connecting rods are coupled to two sides of the corresponding guide rails.

8. The turnover mechanism as claimed in claim 2,
wherein each horizontal drive assembly comprises a fixing block mounted on the rotating shaft, a horizontal drive member mounted on the fixing block, and a pushing block connected to the horizontal drive member; and
wherein the horizontal drive member is parallel to the corresponding guide rail, the pushing block is connected to the base of the suction assembly mounted on the end of the guide rail, and the horizontal drive member is configured to drive the suction assembly to move along the guide rail.

9. The turnover mechanism as claimed in claim 2, wherein each of the suction assemblies further comprises a vacuum generator coupled to the at least one suction cup, and the vacuum generator is configured to generate a vacuum in the at least one suction cup.

10. The turnover mechanism as claimed in claim 1, wherein the turnover mechanism further comprises two stopper plates mounted at two ends of the rotating shaft.

11. The turnover mechanism as claimed in claim 1, wherein the bracket comprises a bottom plate and a side plate vertically connected to the bottom plate, and one end of the rotating shaft is rotatably connected to the side plate.

12. The turnover mechanism as claimed in claim 1, wherein at least one of the plurality of guide rails is arranged between the two guide rails opposite to each other.

* * * * *